United States Patent [19]

Doornick et al.

[11] 4,307,891
[45] Dec. 29, 1981

[54] REMOTE CONTROL ROBOT WITH PERSON SUPPORTING PLATFORM

[76] Inventors: Robert Doornick, 393 Rye Beach Ave., Rye, N.Y. 10580; Maris Ambats, 69 Wooster St., New York, N.Y. 10021

[21] Appl. No.: 121,459

[22] Filed: Feb. 14, 1980

[51] Int. Cl.³ ..................... A63H 11/10; A63H 13/02
[52] U.S. Cl. ................................ 280/1.1 R; 46/103; 46/265
[58] Field of Search ............... 280/1.1 R, 1.201, 1.5; 180/8 R, DIG. 3; 46/103, 104, 265, 266

[56] References Cited

U.S. PATENT DOCUMENTS

| D. 252,936 | 9/1979 | Tibbitts, Jr. | D21/1 |
| 3,093,372 | 6/1963 | Cirami | 180/8 R |
| 3,394,770 | 7/1968 | Goodacre | 180/54 |
| 3,507,222 | 4/1970 | Cirami | 180/8 R |
| 3,749,192 | 7/1973 | Karchak et al. | 180/DIG. 3 |
| 4,095,367 | 6/1978 | Ogawa | 46/105 |
| 4,119,164 | 10/1978 | Fogg, Jr. et al. | 180/6.5 |
| 4,141,175 | 2/1979 | Barlow et al. | 46/103 |
| 4,155,416 | 5/1979 | Ausmus | 180/DIG. 3 |

FOREIGN PATENT DOCUMENTS 46-330784 of 1971 Japan .
51-424470 of 1976 Japan .
51-424471 of 1976 Japan .
52-451277 of 1977 Japan .

Primary Examiner—Joseph F. Peters, Jr.
Assistant Examiner—Donn McGiehan
Attorney, Agent, or Firm—Lane, Aitken, Kice & Kananen

[57] ABSTRACT

A humanoid appearing robot adapted for movement relative to a ground support surface includes a removable passenger carrying platform attached to a base portion thereof. The platform serves to both provide the robot with a passenger carrying capability that enhances the entertainment value of the robot and to enhance the stability of the robot during movement relative to a ground surface. The platform may be removed when the passenger carrying capability is not desired or when it is necessary to maneuver the robot in confined spaced, e.g., the interior of a passenger carrying aircraft. Arm-like members are articulatably connected to a torso portion of the robot and include articulatable hand-like members for grasping and releasing small objects. The arm-like members are articulatable to a forwardly extended position to provide lateral support for a passenger on the platform. An articulatable head-like module is mounted on the torso portion to complement the robot's humanoid form.

8 Claims, 3 Drawing Figures

REMOTE CONTROL ROBOT WITH PERSON SUPPORTING PLATFORM

BACKGROUND OF THE INVENTION

Field of the Invention

The present invention relates to a humanoid or anthropoid appearing robot used for communication purposes including promotion, amusement, information, entertainment, education, and rehabilitation purposes.

Robots of associated configurations and types have been used for both industrial and for entertainment, communication, and informational purposes. These robots have included both mobile robots and stationary robots intended for use in a fixed position. Humanoid appearing robots generally have been of the toy variety and, as such, have had limited entertainment value. Larger robots, generally approximating the size of an adult human possess greater entertainment value and potential, but the entertainment value, even for mobile robots, is generally limited to an audience observing the movements of the robot.

One problem associated with the shipping of the larger, mobile robots by air is that the robot must generally be crated or otherwise packed and shipped as air cargo. When the robot is used for promotional purposes, the promotional benefits of having the robot board the aircraft, occupy a seat, and disembark from the aircraft in a human-like manner are lost.

SUMMARY OF THE INVENTION

In view of the above, it is an object of the present invention among others, to provide a humanoid appearing robot that possesses enhanced entertainment value when compared to prior robots.

It is another object of the present invention to provide a humanoid appearing robot for entertainment and informational purposes having a passenger carrying capability that greatly enhances the robot's amusement value.

It is a further object of the present invention to provide a humanoid appearing robot having greatly enhanced entertainment, amusement, and informational value by providing a passenger carrying capability in which the robot includes articulatable members that provide lateral support for a passenger.

It is still another object of the present invention to provide a humanoid appearing robot having enhanced promotional, entertainment, and information value by virtue of its passenger carrying capability and which also can be adapted for maneuvering in confined spaces such as the interior of a commercial passenger carrying aircraft.

A remote control robot in accordance with the present invention includes a torso-like portion having a articulatable head-like unit, two articulatable arm-like members, and a passenger carrying platform adapted to be readily secured to and removed from the base of the torso. The platform includes a ground engaging element, such as an idler wheel, and, in its secured position, is adapted to both support the weight of a human passenger and enhance the stability of the robot during movement relative to a ground support surface. The arm-like members are each articulatable to a forwardly extended position to provide lateral support as the robot transports the passenger. Ground engaging traction elements mounted in the base of the torso and powered by selectively operated motors enable the robot to maneuver freely over a ground surface. The torso of the robot is dimensioned so that the robot, when the platform is removed, will readily maneuver in confined spaces such as the inter-row space of a conventional passenger carrying aircraft to permit convenient air-transportation of the robot.

DESCRIPTION OF THE FIGURES

The above description, as well as the objects, features, and advantages of the present invention will be more fully appreciated by reference to the following detailed description of a presently preferred but nonetheless illustrative embodiment in accordance with the present invention, when taken in conjunction with the accompanying drawings wherein.

DESCRIPTION OF THE PREFERRED EMBODIMENT

Figure 1:
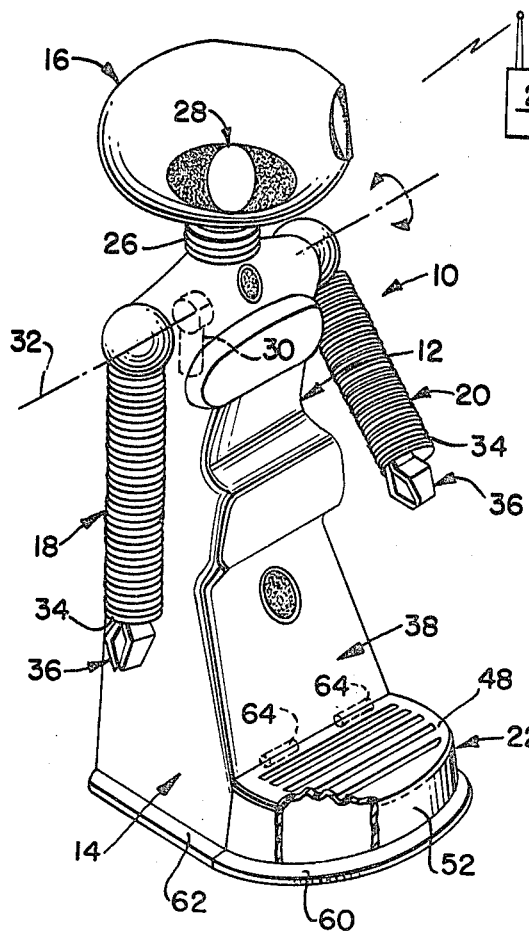
FIG. 1 is a perspective view of a remote control robot in accordance with the present invention having a passenger supporting platform attached to a torso portion.
Figure 2:
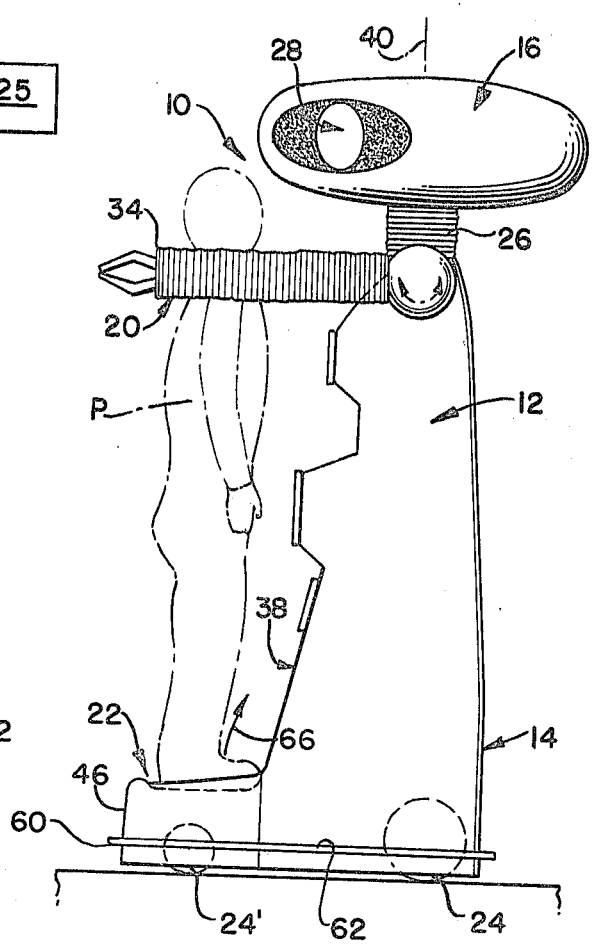
FIG. 2 is a side elevational view of the robot shown in FIG. 1.

A remote control robot in accordance with the present invention suitable for entertainment, promotional, information, teaching, and rehabilitative purposes is generally referred to in the figures by reference character 10. As shown in FIG. 1, the robot 10 includes a torso-like portion 12 positioned above a base portion 14. In the preferred embodiment, the base portion 14 and torso 12 are molded from a suitable material such as fiberglass or structural plastic to define a hollow, unitary figure which is mounted over a support frame or superstructure (not shown). In the alternative, the base 14 may be a separate section secured to the torso portion 12 by conventional fastening means. A head-like unit 16 and arm-like members 18 and 20 are pivotably secured to the torso-like portion 14. A platform 22 having an upwardly facing support surface is provided to comfortably accommodate a human passenger (either an adult or a child) and is removably attached to the base 14 of the torso portion 12 as described in more detail below. The base 14 is equipped with ground-engaging traction elements such as main traction wheels 24 connected to associated drive motors (not shown). As unpowered freely rotatable idler wheel 24' is connected to the platform 22 as illustrated in FIG. 2. The main drive motors may be selectively and differentially driven to cause the robot to move in a straight line, turn about its polar axis, or turn at a selected radius relative to a ground support surface. The mounting of the idler wheel 24' under the platform 22 enhances the stability of the robot during movement relative to a ground surface by providing a generous wheelbase dimension (that is, the distance between the axis of the drive wheels 24 and that of the idler wheel 24'). When the platform 22 and its attached idler wheel 24' are removed, the robot 10 may be maneuvered in confined spaces, e.g., the inter-row space of conventional passenger carrying aircraft. Thus, the platform 22, when attached to the robot 10 enhances the promotional and entertainment value thereof by providing a passenger carrying capability and also enhances the maneuvering stability of the robot 10 by providing a generous wheelbase. However, the platform 22, when removed, also allows the robot 10 to be maneuvered in the confined areas of a passenger carrying aircraft to permit convenient air transportation thereof. Selective control of the robot's movements, described in more detail below, is initiated and controlled by a remote radio signal source schematically represented at 25 in FIG. 1.

In the preferred embodiment, the head unit 16 is attached to the top surface of the torso-like portion 12 by a neck-like extension 26 through which various mechanical and electrical connections are effected. The head unit 16 is articulatable about two axes and is formed as an ellipsoid or spheroid having at least one and preferably two simulated eye panels 28.

The torso portion 14 has a humanoid or antropoid appearance in so far as it includes a forwardly facing side and a rearwardly facing side. The torso portion 14 is equipped with mechanical and electrical connections to the head-like unit 16 through the aforementioned neck 26 and to the arm-like members 18 and 20. The torso portion 14 also functions as a housing for the control circuitry that receives signals, including signals that control the robot's motion and full duplex audio signals, from the radio control signal source 25 and for housing gearhead motors 30 (only one of which is shown in broken-line illustration in FIG. 1) that are coupled to the arm-like members 18 and 20 and that effect bidirectional articulation of the arm-like members about a generally horizontal axis 32 as described below. The radio signal transmission and reception circuitry and the motor control circuits do not form part of the subject matter of the present invention and a detailed explanation thereof is omitted.

The arm-like members 18 and 20 are connected to the lateral sides of the torso-like portion 14 to resemble the shoulder joints and arms of a person. The arm-like members 18 and 20 each include an elongated framework (not shown) and a flexible sleeve-like sheathing 34 placed over the framework. Clam shell-like gripping structures 36 are located at the distal end of each arm and are individually operable to grasp, move, and release small objects. Precoded radio control signals from the radio signal source 25 activates the motors 30, either individually or in unison, to move the arm-like members 18 and 20 about the horizontal axis 32 to a desired detailed including the forwardly extended position shown in FIG. 2 in which the arm members 18 and 20 are generally horizontal.

Figure 3:
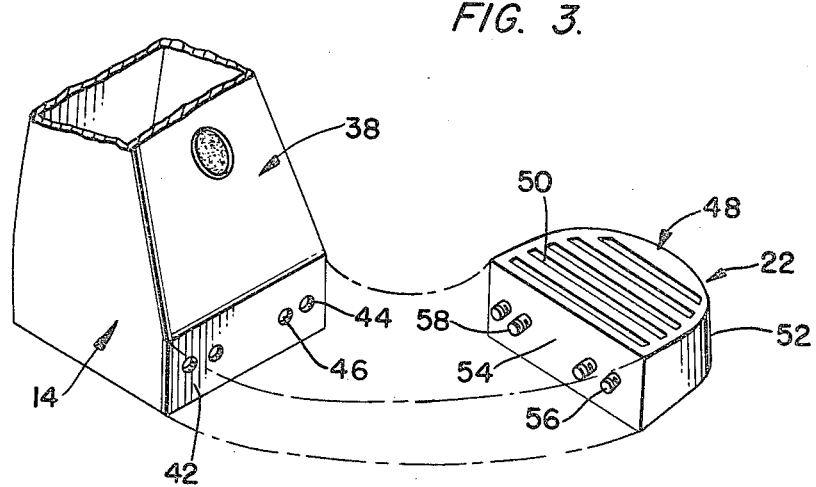
FIG. 3 is a detailed view of the passenger carrying platform shown in FIG. 1 displaced from the base of the torso portion of the robot.

As shown in FIG. 1, the base portion 14 forms the lower part of the torso-like portion 12 and includes a forwardly facing panel 38 that extends at an acute angle relative the vertical axis 40 and joins or meets with a generally vertical base-abutting surface 42 as shown in FIG. 3. The base abutting surface 42 includes two spaced-apart dowel receiving holes 44 and two spaced-apart threaded holes 46 all of which are used in detachably securing the passenger carrying platform 22 to the base portion 14 of the torso 12.

The platform 22 is shown attached to the torso in FIG. 1 and FIG. 2 and detached therefrom in FIG. 3. The platform 22 includes a generally flat, upwardly facing surface 48 that preferably includes friction enhancing stripes 50, a generally vertical, curvilinear forwardly facing wall 52, and a flat, rearwardly facing wall 54 that is designed to abut the wall 42 of the torso 12 in a face-to-face relationship. In the preferred embodiment, the platform 22 is formed from a hollow body fabricated from the same material as the torso 12. Two spaced apart dowels or pins 56 are mounted on the rear wall 54 of the platform 22 and are adapted to be received within the aforementioned dowel receiving holes 44. In addition, two captive threaded fasteners 58 are located in the rear wall of the platform 22 and are adapted to be received within the aforementioned threaded holes 46 for detachably securing the platform 22 to the base 14. An elastomer bumper strip 60 is secured to the outwardly facing surfaces of the platform 22 and another bumper strip 62 is secured to the outwardly facing surfaces of the base 14 to cushion any impact.

While the dowel pin 56 and threaded fastener 58 arrangement shown in FIG. 3 and described above is preferred, other connecting arrangements for the platform 22 may be used. For example, hinge assembles 64 (shown in broken-line illustration in FIG. 1) that include hinge leaves and interconnecting hinge pins may be used. When it is desired to remove the platform 22, the hinge pins can be removed to effect separation. In the alternative, the platform 22 can be configured to rotate about the hinges 64 (as indicated by the arrow 66 in FIG. 2) to an upwardly rotated, stowed position to enable maneuvering in confined spaces. Releasable latches (not shown) may be provided to latch the platform 22 in both its lowered position and its stowed position with the upwardly facing surface 48 in an adjacent face-to-face relationship with the forwardly sloping panel 38 of the robot 10.

In operation, a person P mounts the platform 22 and faces in either the forward direction or the rearward direction as shown in FIG. 2. The robot operator(s) (not shown) of the remote control device 25 initiates appropriate radio control signals to activate the arm-like members 18 and 20 to cause them to rotate about the axis 32 to a generally horizontal position (FIG. 2) to thereby extend on both sides of the passenger to provide lateral support for the passenger. The ground engaging traction elements 24 are activated to position and then move the robot 10 in the desired direction with the idler wheel 24' providing enhanced maneuvering stability. The robot operator may also engage in conversation with the passenger through the duplex audio channel.

It has been found that in amusement, entertainment, promotional, and information providing environments and also in the teaching and rehabilitation environments the value of the robot 10 and the attention it receives from an audience is greatly enhanced by the passenger carrying aspect in contrast to its non-passenger carrying mode and, consequently, the platform 22 significantly enhances the value of a robot in these environments.

In addition to enhancing the value of the robot in the environments discussed above, the removable nature of the platform permits the robot to be conveniently transported by aircraft. The base and torso portion of the robot are dimensioned so that the robot, when the platform is removed or stowed, will fit in the inter-row space in conventional passenger carrying aircrafts. Thus, the robot can board and disembark from an aircraft under its own power and need not be crated or otherwise shipped as cargo.

As will be apparent to those skilled in the art, various changes and modifications may be made to the disclosed embodiment without departing from the spirit and scope of the present invention as defined in the depending claims and their legal equivalent.

What is claimed is:

1. A humanoid-like remote control robot for entertainment and promotional purposes comprising:
    a torso-like portion having a forwardly-facing side, a rearwardly-facing side and a base portion that includes ground engaging traction elements mounted therein to enable movement of the robot relative to a ground support surface;
    a head-like unit secured to said torso-like portion;
    a platform attached to said forwardly-facing side at said base portion of said torso-like portion to provide a support surface for a passenger standing thereon;
    two-arm like members attached to said torso-like portion, said arm-like members being articulatable about a generally horizontal axis to a forwardly extended position to provide lateral support on each side of a passenger standing on said platform.

2. The apparatus as claimed in claim 1 wherein said platform is attached to said base portion of said torso-like portion by mounting means to permit attachment and removal of said platform.

3. The apparatus as claimed in claim 2, wherein said mounting means comprises a dowel assembly, said dowel assembly including at least two dowels in spaced-apart relationship in said platform positioned to be received with corresponding dowel-receiving holes in an abutting surfaces of said base portion of said torso-like portion.

4. The apparatus as claimed in claim 3, wherein said mounting means further comprises:
    threaded fasteners securing said platform and said torso together.

5. The apparatus claimed in claim 1 further comprising:
    a wheel element rotatably mounted on said platform for engagement with a ground support surface.

6. A humanoid-like remote control robot for entertainment and promotional purposes comprising:
    a torso-like portion having a forwardly-facing side, a rearwardly-facing side and a base portion that includes ground engaging traction elements mounted therein to enable movement of the robot relative to a ground support surface;
    a head-like unit secured to said torso-like portion;
    a platform attached to said forwardly-facing side at said base portion of said torso-like portion to provide a support surface for a passenger standing thereon;
    two elongated arm-like members attached to said torso-like portion, one arm-like member attached, at a proximate shoulder end thereof, to each lateral side of said torso-like portion, said arm-like members connected to motor means within said torso-like portion and rotatable in response to selective actuation of said motor means about a generally horizontal axis between a lower generally vertical position and a forwardly extended position to provide lateral support on each side of a passenger standing on said platform.

7. The apparatus claimed in claims 1 or 6, further comprising:
    articulatable gripping means located at the distal hand end of each arm-like member.

8. The apparatus claimed in claims 1 or 6, further comprising:
    a neck-like extension connected between said torso-like portion and said head-like unit.

* * * * *